(12) United States Patent
Ding et al.

(10) Patent No.: US 11,773,695 B1
(45) Date of Patent: Oct. 3, 2023

(54) MULTI-TYPE HYDRATE FORMATION SIMULATION SYSTEM AND METHOD THEREOF

(71) Applicant: China University of Petroleum (Beijing), Beijing (CN)

(72) Inventors: Pinbo Ding, Beijing (CN); Weiping Xu, Beijing (CN); Feng Zhang, Beijing (CN); Xiangyang Li, Beijing (CN); Jianxin Wei, Beijing (CN); Bangrang Di, Beijing (CN)

(73) Assignee: CHINA UNIVERSITY OF PETROLEUM (BEIJING), Beijing (CN)

( * ) Notice: Subject to any disclaimer, the term of this patent is extended or adjusted under 35 U.S.C. 154(b) by 0 days.

(21) Appl. No.: 18/154,414

(22) Filed: Jan. 13, 2023

(30) Foreign Application Priority Data

Jul. 27, 2022 (CN) .......................... 202210892391.7

(51) Int. Cl.
*G01N 3/12* (2006.01)
*E21B 41/00* (2006.01)

(52) U.S. Cl.
CPC ........... *E21B 41/0099* (2020.05); *G01N 3/12* (2013.01); *E21B 2200/20* (2020.05)

(58) Field of Classification Search
CPC .. G01N 3/12; G01N 3/08; G01N 3/02; G01N 19/00; G01N 33/225; G01N 15/082; G01N 33/222; G01N 33/24; G01N 1/2294; G01N 23/046; G01N 25/18; G09B 25/02; G01V 1/40; E21B 47/06; E21B 47/10; E21B 21/08; E21B 43/08; G01M 13/003

See application file for complete search history.

(56) References Cited

U.S. PATENT DOCUMENTS

| | | | | |
|---|---|---|---|---|
| 11,092,706 | B1* | 8/2021 | Ding | G01V 1/282 |
| 2016/0305205 | A1 | 10/2016 | Li et al. | |
| 2020/0072734 | A1* | 3/2020 | Ye | G01N 19/04 |
| 2021/0263005 | A1* | 8/2021 | Zhu | G09B 25/02 |

FOREIGN PATENT DOCUMENTS

| | | | |
|---|---|---|---|
| CN | 103775069 | A | 5/2014 |
| CN | 113776925 | A | 12/2021 |

* cited by examiner

*Primary Examiner* — Brandi N Hopkins
(74) *Attorney, Agent, or Firm* — Volpe Koenig (57) ABSTRACT

The disclosure provides a multi-type hydrate formation simulation system and a method thereof. The simulation system comprises a hydrate generator, a gas source device and a cryogenic cooler. The hydrate generator comprises a reactor, in which a formation simulation space is provided and can be selectively filled with a loose formation skeleton or a consolidated formation skeleton. The gas source device is configured to introduce natural gas at a preset pressure into the formation simulation space. The cryogenic cooler comprises a temperature-adjustable thermotank, in which the hydrate generator is arranged. The simulation system and method provided can be used to study the influence of consolidated hydrate formation structures and loose hydrate formation structures and particle contact modes on the physical properties of hydrate rock, and are of great significance to the interpretation of hydrate formation exploration data and the estimation of hydrate saturation.

10 Claims, 6 Drawing Sheets

MULTI-TYPE HYDRATE FORMATION SIMULATION SYSTEM AND METHOD THEREOF

CROSS-REFERENCE TO RELATED APPLICATIONS

This application claims priority under 35 U.S.C. § 119(a) to CN 202210892391.7, which was filed Jul. 27, 2022 and is incorporated herein by reference as if fully set forth.

FIELD

The present disclosure belongs to the technical field of geological exploration, in particular to a multi-type hydrate formation simulation system and a method thereof.

BACKGROUND

With the advancement of industrialization, the reserves of conventional fossil energy resources such as petroleum are decreased increasingly, and seeking for suitable alternative energy resources has become a hot spot in the researches recently. Natural gas hydrates are an important fossil energy resource with abundant reserves, and the successful exploitation of natural gas hydrates will play an important role in alleviating the increasingly tense petroleum energy crisis.

Natural gas hydrates mainly exist in sea areas and frozen soil areas. Natural gas hydrates are abundant in the South China Sea, East China Sea and other sea areas, Chi-lien Mountains, and tundra areas in the Northeast China region in China. The hydrate formations in different areas of occurrence are quite different from each other in terms of their porosity, density and elastic modulus, and different types of formations have different influences on the properties of hydrates. It is of great significance to study the properties of various types of hydrate formations.

At present, the researches on hydrates at home and abroad mainly focus on loose sand, but rarely involve consolidated formations. Moreover, the equipment in each research institution is deficient, and it is usually only suitable for the research on a single type of formations. However, the hydrate formations in the same region are of various types, such as loose type, consolidated type, fractured type, etc., owing to the wide distribution and different formation densities. Therefore, it is of higher significance to study different types of formation hydrates.

SUMMARY

A main object of the present disclosure is to propose a multi-type hydrate formation simulation system and a method thereof, in order to study the properties of different types of formation hydrates.

To achieve the above object, the present disclosure provides a multi-type hydrate formation simulation system, which comprises:
  a hydrate generator, comprising a reactor, in which a formation simulation space is provided and can be selectively filled with a loose formation skeleton or a consolidated formation skeleton;
  a gas source device configured to introduce natural gas at a preset pressure into the formation simulation space, so that the loose formation skeleton or the consolidated formation skeleton can produce a simulated loose hydrate formation or a consolidated hydrate formation; and
  a cryogenic cooler, comprising a temperature-adjustable thermotank, wherein the hydrate generator is arranged in the thermotank, and a temperature adjustment range of the thermotank is −10~20° C.

In an embodiment of the present disclosure, the hydrate generator further comprises a gas inlet part and a gas outlet part, wherein the gas inlet part is arranged in the body of the reactor near the bottom of the of the reactor, and the gas outlet part is mounted on an upper end face of a top cover of the reactor; a gas outlet pipe connecting the formation simulation space to the external environment is provided in the gas outlet part in a manner that the gas outlet pipe penetrates through the gas outlet part vertically, the gas inlet part is in communication with the gas source device via a gas inlet pipe; and two radial side ends of the gas inlet part are connected to a lower end face of the top cover of the reactor via support rods.

In an embodiment of the present disclosure, the top of the reactor is provided with a sealing column, the gas outlet part penetrates through the sealing column and extends out of an upper end face of the sealing column, and the sealing column is rotatably connected to the top of the reactor through threads.

In an embodiment of the present disclosure, the formation simulation space is the entire internal space of the reactor, in which the loose formation skeleton is filled.

In an embodiment of the present disclosure, a hollow pressure-resistant hose is provided in the reactor, with a central axis of the pressure-resistant hose coinciding with a central axis of the reactor; the formation simulation space is a hollow cavity of the pressure-resistant hose, the solidified formation skeleton is filled in the hollow cavity of the pressure-resistant hose, the gas inlet part is inserted into the pressure-resistant hose from the bottom, and the gas outlet part is inserted into the pressure-resistant hose from the top.

In an embodiment of the present disclosure, the central axis of the pressure-resistant hose coincides with the central axis of the reactor, and pressure-resistant oil exerting confining pressure on the pressure-resistant hose axially is filled between an outer circumferential wall of the pressure-resistant hose and an inner circumferential wall of the reactor.

In an embodiment of the present disclosure, the gas source device comprises:
  a gas source assembly, comprising a gas source and a gas cylinder, wherein the gas cylinder is configured to store the natural gas from the gas source and output the natural gas through the gas inlet pipe; and
  a pressurizing assembly, comprising a pressurizing cylinder and a pressurizing pump, wherein the pressurizing pump is connected to the reactor and the pressurizing cylinder through a second pressurizing pipeline and a first pressurizing pipeline respectively.

In an embodiment of the present disclosure, the gas inlet pipe, the gas source and the gas cylinder are provided with a pressure gauge for monitoring the pressure respectively.

In an embodiment of the present disclosure, a first communication pipeline between the gas source and the gas cylinder, a second communication pipeline between the gas cylinder and the pressurizing cylinder, the second pressurizing pipeline, the first pressurizing pipeline, the gas inlet pipe and the gas outlet pipe are provided with a stop valve for controlling the connection and disconnection of the respective pipeline respectively.

In an embodiment of the present disclosure, a multi-type hydrate formation simulation method is further proposed.

The method uses the multi-type hydrate formation simulation system as described above, and comprises the following steps:
  step S1: preparing a formation core sample and placing the formation core sample in the formation simulation space in the reactor;
  step S2: filling natural gas into the reactor via the gas source device, so that the pressure of the reactor is within a preset pressure range;
  step S3: adjusting the cryogenic cooler so that the temperature of the reactor is within a preset temperature range; and
  step S4: observing the pressure change inside the reactor during hydrate formation.

With the above technical scheme, the multi-type hydrate formation simulation system provided in the embodiments of the present disclosure has the following beneficial effects:

Different types of formation samples can be placed in the formation simulation space in the hydrate generator, and adequate gas and pressure are provided by means of the gas pressurizing device, and an appropriate temperature meeting the experimental requirements is provided by means of the cryogenic cooler. In the hydrate generator of the present disclosure, a variety of types of hydrate formations can be simulated, including loose formations and consolidated formations with different porosities, which correspond to actual hydrate formations. The rocks of different types of hydrate formations have different physical properties, and are quite different from each other in terms of their density, porosity and elastic modulus. Therefore, studying the physical properties of the rocks of various types of hydrate formations can provide more scientific and accurate experimental data and provide an experimental basis for the exploration and development of hydrates.

Other features and advantages of the present disclosure will be further detailed in the following embodiments.

BRIEF DESCRIPTION OF THE DRAWINGS

The accompanying drawings are provided herein to facilitate understanding on the present disclosure and constitute a part of this document. They are used in conjunction with the following embodiments to explain the present disclosure, but are not intended to constitute any limitation to the present disclosure. In the figures.

| Reference Numbers | |
|---|---|
| No. | Name |
| 10 | Hydrate generator |
| 11 | Reactor |
| 12 | Pressure-resistant hose |
| 13 | Formation simulation space |
| 14 | Gas inlet part |
| 15 | Gas outlet part |
| 16 | Sealing column |
| 17 | Support rod |
| 18 | Gas outlet pipe |
| 19 | Gas inlet pipe |
| 20 | Thermotank |
| 30 | Gas source device |
| 31 | gas source |
| 32 | Gas cylinder |
| 33 | Pressurizing cylinder |
| 34 | Pressurizing pump |
| 35 | First pressurizing pipeline |
| 36 | Second pressurizing pipeline |
| 37 | First communication pipeline |
| 38 | Second communication pipeline |
| 40 | Loose formation skeleton |
| 50 | Consolidated formation skeleton |
| 60 | Pressure gage |
| 70 | Acoustic transducer |

DETAILED DESCRIPTION

Hereunder some embodiments of the present disclosure will be detailed with reference to the accompanying drawings. It should be understood that the embodiments described herein are only provided to describe and explain the present disclosure, but are not intended to constitute any limitation to the present disclosure.

The multi-type hydrate formation simulation system and method according to the present disclosure will be described below with reference to the accompanying drawings.

Figure 1:
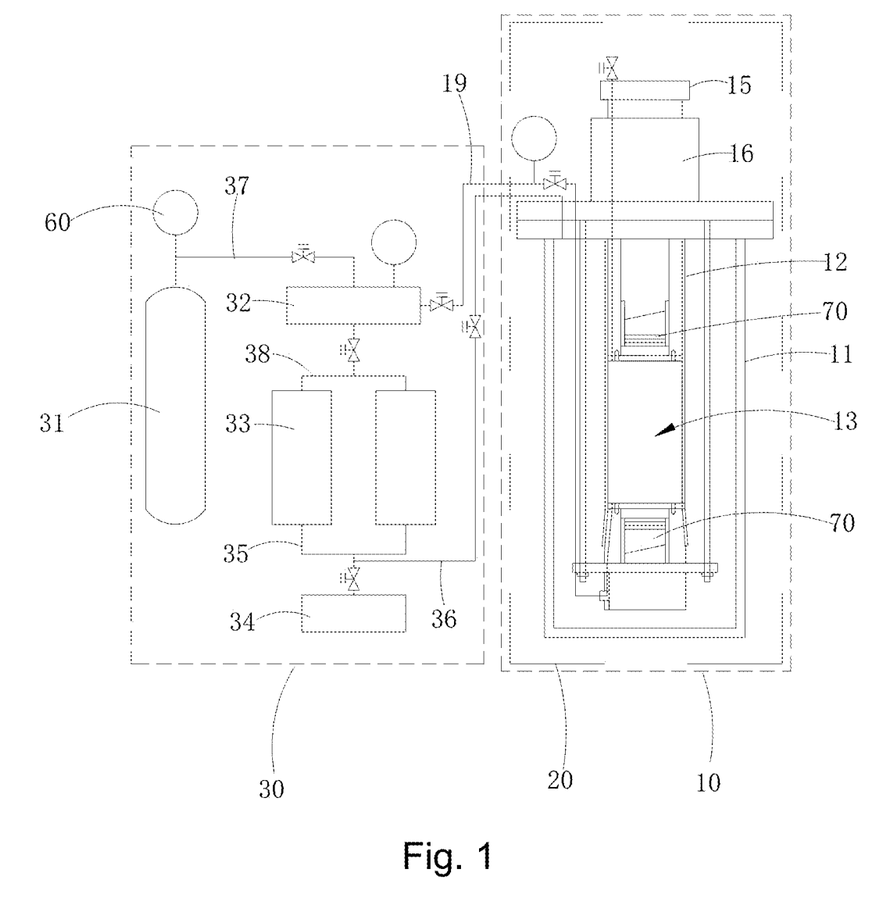
FIG. 1 is a schematic structural diagram of the multi-type hydrate formation simulation system according to a second embodiment of the present disclosure.
Figure 3:
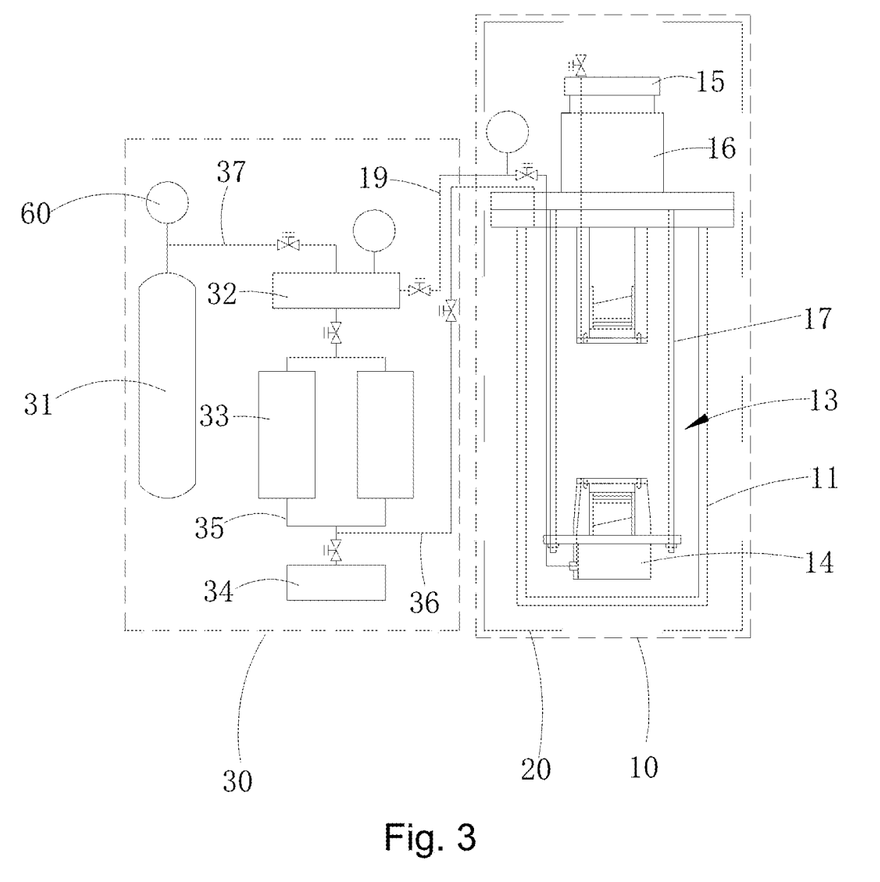
FIG. 3 is a schematic structural diagram of the multi-type hydrate formation simulation system according to a first embodiment of the present disclosure.

At present, the researches on hydrates at home and abroad mainly focus on loose sand, but rarely involve consolidated formations. Moreover, the equipment in each research institution is deficient, and it is usually only suitable for the research on a single type of formations. However, the hydrate formations in the same region are of various types, such as loose type, consolidated type, and fractured type, etc., owing to the wide distribution and different formation densities. Therefore, an experimental system designed to simulate various types of hydrate formations and test different types of formation samples in the same testing environment can provide more accurate results, and can accurately compare the differences between loose hydrate formations and consolidated hydrate formations, thereby provides scientific and reliable experimental data for hydrate research. As shown in FIGS. 1 and 3, the multi-type hydrate formation simulation system comprises:
  a hydrate generator 10, comprising a reactor 11, in which a formation simulation space 13 is provided and can be selectively filled with a loose formation skeleton 40 or a consolidated formation skeleton 50;
  a gas source device 30 configured to introduce natural gas at a preset pressure into the formation simulation space 13, so that the loose formation skeleton 40 or the consolidated formation skeleton 50 can produce a simulated loose hydrate formation or a consolidated hydrate formation; and a cryogenic cooler, comprising a temperature-adjustable thermotank 20, wherein the hydrate generator 10 is arranged inside the thermotank 20, the temperature adjustment range of the thermotank 20 is −10~20° C., and the adjustment accuracy is ° C.; the reactor 11 in the hydrate generator 10 employs a removable structure, and can be taken out of the thermotank 20 conveniently.

Adequate gas and pressure are provided by means of the gas pressuring device, and an appropriate temperature meeting the experimental requirements is provided by means of the cryogenic cooler. The body of the hydrate generator 10 is a metal reactor 11, which has high pressure bearing capacity. The reactor 11 is filled with an aqueous sample that meets the requirements for a real hydrate formation. The reactor 11 can meet the experimental requirements for the gas source 31, temperature, pressure, water, etc. during hydrate generation, and can continuously generate hydrates. The formation of hydrates is a dynamic process rather than an instant one, and the time of formation is determined according to the temperature and pressure conditions in the experiment and the size of the sample. As a hydrate is formed, the saturation gradually increases (the saturation of a hydrate refers to a ratio of the volume of the hydrate generated to the total porosity of the sample).

In the hydrate generator 10 of the present disclosure, a variety of types of hydrate formations can be simulated, including loose hydrate formations and consolidated hydrate formations with different porosities, which correspond to real hydrate formations. The rocks of different types of hydrate formations have different physical properties, and are quite different from each other in terms of their density, porosity and elastic modulus. Therefore, studying the physical properties of the rocks of various types of hydrate formations can provide more scientific and accurate experimental data and provide an experimental basis for the exploration and development of hydrates.

In an embodiment of the present disclosure, the hydrate generator 10 further comprises a gas inlet part 14 and a gas outlet part 15, wherein the gas inlet part 14 is arranged in the body of the reactor 11 near the bottom of the of the reactor 11, and the gas outlet part 15 is mounted on an upper end face of a top cover of the reactor 11; a gas outlet pipe 18 connecting the formation simulation space 13 to the external environment is provided in the gas outlet part 15 in a manner that the gas outlet pipe 18 penetrates through the gas outlet part 15 vertically, the gas inlet part 14 is in communication with the gas source device 30 via a gas inlet pipe 19; and two radial side ends of the gas inlet part 14 are connected to a lower end face of the top cover of the reactor 11 via support rods 17.

In an embodiment of the present disclosure, the top of the reactor 11 is provided with a sealing column 16, the gas outlet part 15 penetrates through the sealing column 16 and extends out of an upper end face of the sealing column 16, and the sealing column 16 is rotatably connected to the top of the reactor 11 through threads.

The space in the reactor 11 can be adjusted according to the size of the sample, and fits well with the formation sample, thereby excessive space occupation by the gas in the cavity of the reactor 11 is avoided during hydrate formation, and the experimental error is reduced.

Figure 4:
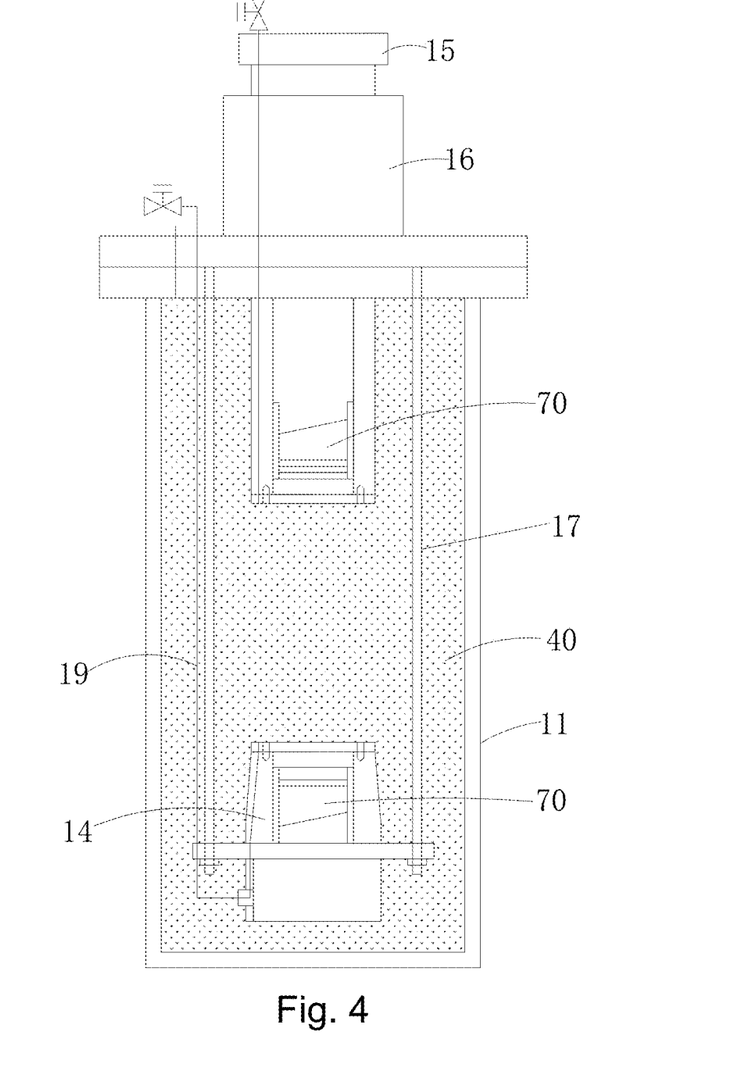
FIG. 4 is a schematic structural diagram of the reactor in the multi-type hydrate formation simulation system according to the first embodiment of the present disclosure.

In a first embodiment, as shown in FIG. 4, when a loose hydrate formation is to be simulated, the formation simulation space 13 is the entire internal space of the reactor 11, and the cavity of the reactor 11 is fully filled with loose sand. The entire space is filled with a loose formation skeleton 40.

In view that the pressure difference between the loose formation and the surrounding formation is very small, the effect of confining pressure is ignored in the experiment, and the self-weight of the loose formation sample is used as the pressure. A loose formation can be simulated with loose sand, because the formation contains a lot of sand. After the simulation of the loose formation skeleton 40 is completed, the gas pressure, temperature and other factors are adjusted, so that hydrates are formed gradually.

Figure 2:
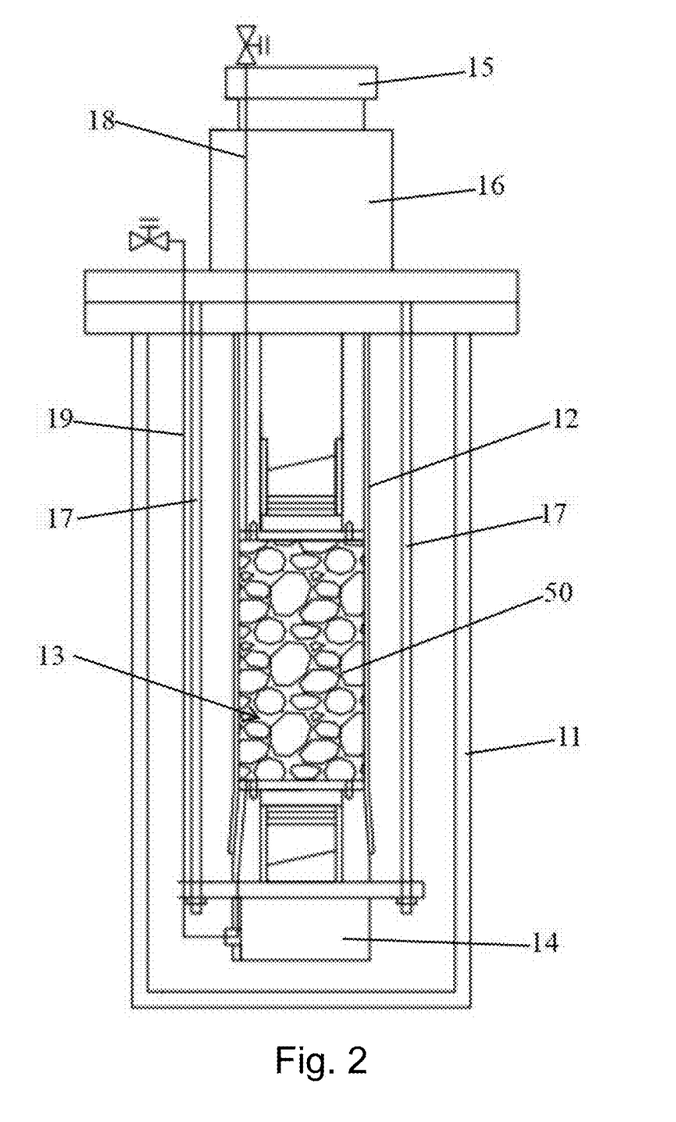
FIG. 2 is a schematic structural diagram of the reactor in the multi-type hydrate formation simulation system according to the second embodiment of the present disclosure.
Figure 5:
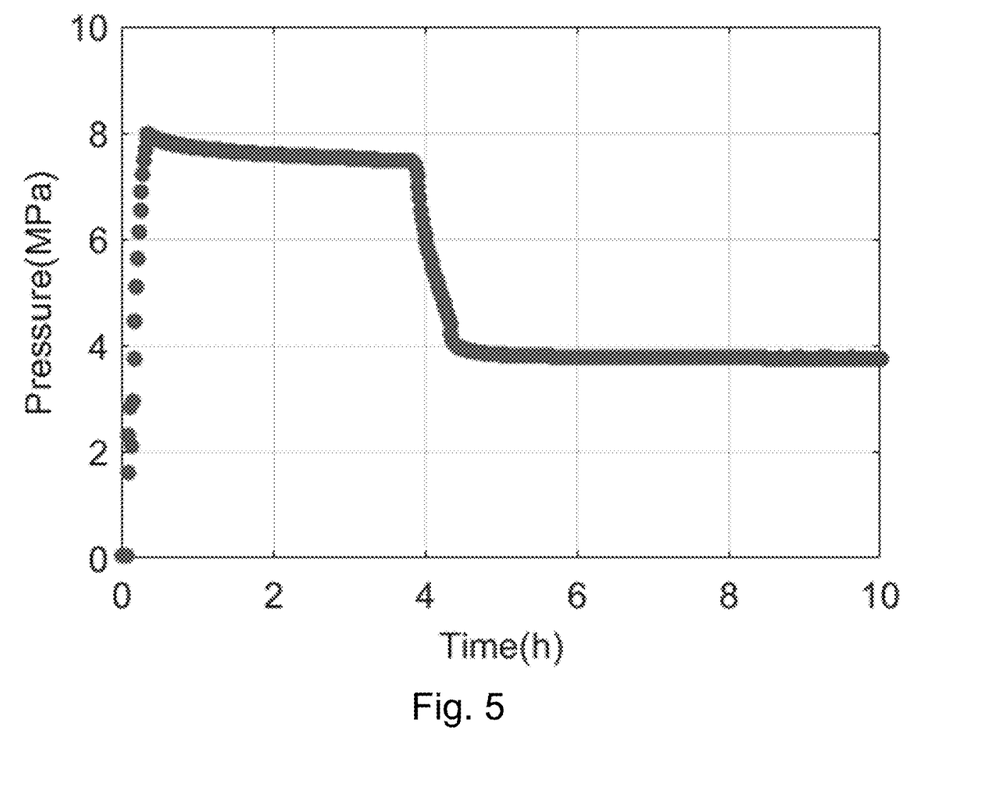
FIG. 5 is a curve chart showing the change of the pore pressure curve during hydrate formation in the multi-type hydrate formation simulation system according the present disclosure when hydrate formation conditions are met.
Figure 6:
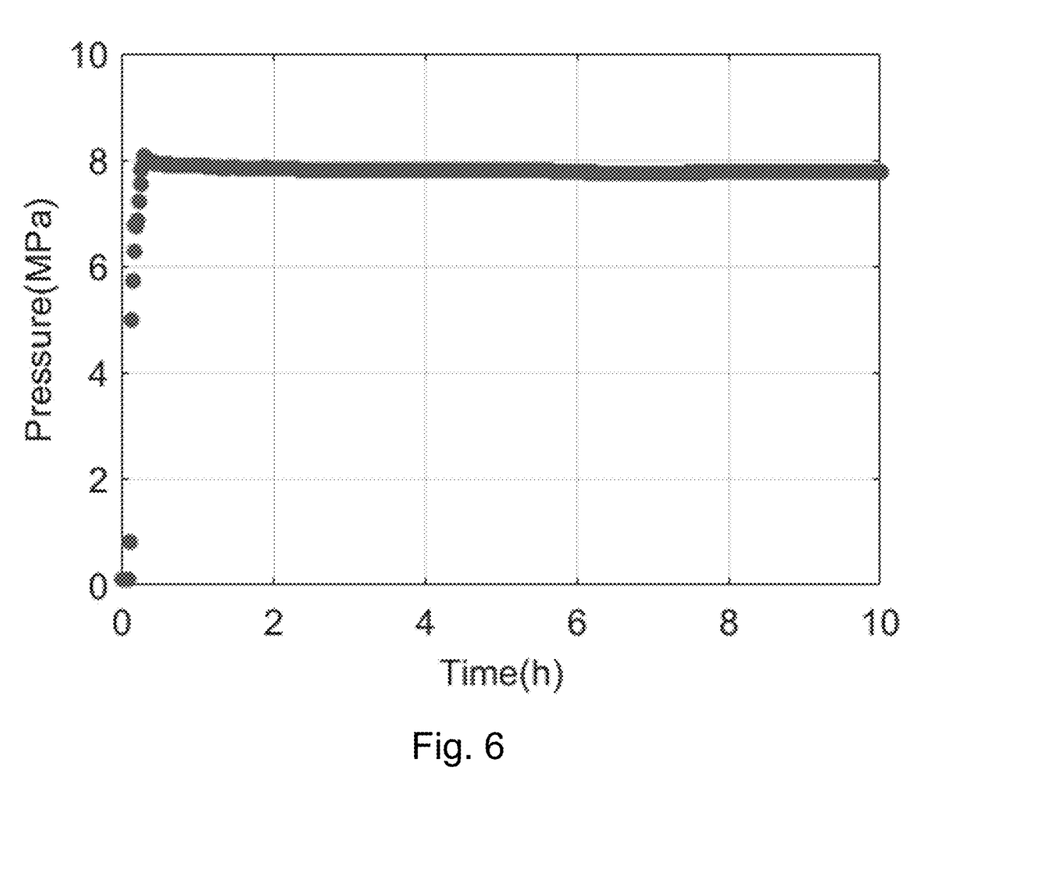
FIG. 6 is a curve chart showing the change of the pore pressure curve of a sample in the multi-type hydrate formation simulation system according to the present disclosure when hydrate formation conditions are not met.

In the second embodiment, as shown in FIG. 2, when a consolidated hydrate formation is to be simulated, a hollow pressure-resistant hose 12 is arranged in the reactor 11, and the central axis of the pressure-resistant hose 12 coincides with the central axis of the reactor 11. The specially-made pressure-resistant hose 12 is used to connect the gas inlet part 14 at the top with the gas outlet part 15 and the bottom of the sample. A prepared consolidated hydrate formation skeleton is placed into the central part of the specially-made pressure-resistant hose 12 after it is pretreated, such as cleaning, drying, saturation and cutting, etc.; the two ends are connected with the sample via the gas inlet part 14 and the gas outlet part 15, the gas is introduced through the gas inlet part 14 at the bottom of the sample and discharged through the gas outlet part 15 at the top of the sample, and the sample is sealed. The entire apparatus is placed into the reactor 11, and the internal space of the reactor 11 is filled with liquid. After the gas tightness of the apparatus is confirmed, more liquid is injected into the internal space of the reactor 11 by means of the pressurizing pump 34, and a certain confining pressure is applied. Since the specially-made pressure-resistant hose 12 is pliable and tough, and fully fits the consolidated formation skeleton 50, it can transfer the pressure fully to the sample in the formation simulation space 13, thus the pressure of the surrounding strata in the actual formation can be simulated. Owing to the fact that hydrates are formed in a consolidated formation only after the formation is stable, it is necessary to apply confining pressure first, and then introduce the gas, so as to achieve a better experimental simulation effect, and form hydrates gradually by adjusting the gas pressure, temperature and other factors. In view that the rock in a real consolidated formation is subjected to the pressure from the surrounding strata, a confining pressure is applied in consistence with an actual consolidated formation. Therefore, the apparatus can simulate the environments of different types of hydrate formations better and obtain more accurate hydrate simulation data. As shown in FIG. 6, the pore pressure doesn't change until the conditions in the reactor 11 meet the hydrate formation conditions. As shown in FIG. 5, after the hydrate formation conditions are met, the pressure increases rapidly to about 8 MPa with the time, and then becomes stable for a certain time period, during which the process of hydrate formation proceeds, and the saturation of the hydrates gradually increases. When the saturation of the hydrates doesn't increase any more, the hydrates are formed completely, and the pressure is lower than that before and tends to be stable.

In an embodiment of the present disclosure, the central axis of the pressure-resistant hose 12 coincides with the central axis of the reactor 11, and pressure-resistant oil exerting confining pressure on the pressure-resistant hose 12 axially is filled between the outer circumferential wall of the pressure-resistant hose 12 and the inner circumferential wall of the reactor 11, thereby the hydrate production in the formation sample in the pressure-resistant hose 12 is promoted under the confining pressure of the pressure-resistant oil.

In an embodiment of the present disclosure, the gas source device 30 comprises:
- a gas source assembly 30, comprising a gas source 31 and a gas cylinder 32, wherein the gas cylinder 32 is configured to store the natural gas from the gas source 31 and output the natural gas through the gas inlet pipe 19; and
- a pressurizing assembly, comprising a pressurizing cylinder 33 and a pressurizing pump 34, wherein the pressurizing pump 34 is connected to the reactor 11 and the pressurizing cylinder 33 through a second pressurizing pipeline 36 and a first pressurizing pipeline 35 respectively.

The gas pressurizing device is connected to the gas inlet of the hydrate generator 10 through a connecting pipe, and whether the pressure in the formation simulation space 13 meets the experimental requirements can be judged by observing the indication on the pressure gauge 60. The gas source 31 provides the gas and pressure required for the experiment. The gas in the gas source 31 is introduced into the gas cylinder 32 and the pressurizing cylinder 33. When required content is reached, the valve of the gas source 31 is closed. At that point, the gas cylinder 32 and the pressurizing cylinder 33 are in communication with each other through a second communication pipeline 38. By adjusting the volume of the pressurizing cylinder 33 with the pressurizing pump 34, the pressure required in the entire system can be changed till it is adjusted to a value required for the experiment. The pressurizing pump 34 is also connected to the internal space of the reactor 11 through the second pressurizing pipeline 36, so as to control the confining pressure in the hydrate generator 10.

The gas inlet pipe 19, the gas source 31 and the gas cylinder 32 are provided with a pressure gauge 60 for monitoring the pressure respectively, so as to monitor the gas tightness of the hydrate generator and the pressure change during hydrate formation subsequently.

Furthermore, the first communication pipeline 37 between the gas source 31 and the gas cylinder 32, the second communication pipeline 38 between the gas cylinder 32 and the pressurizing cylinder 33, the second pressurizing pipeline 36, the first pressurizing pipeline 35, the gas inlet pipe 19 and the gas outlet pipe 18 are provided with a stop valve for controlling the connection and disconnection of the respective pipeline respectively, so as to control the connection and disconnection of each pipeline.

In an embodiment of the present disclosure, a multi-type hydrate formation simulation method is further proposed. The method uses the multi-type hydrate formation simulation system as described above, and comprises the following steps:
- step S1: preparing a formation core sample, placing the formation core sample in the formation simulation space 13 in the reactor 11, and simulating a consolidated formation skeleton 50 by controlling the pressure in a hydrate formation simulation apparatus for consolidated formation skeleton 50. The consolidated formation skeleton 50 can obtained from a fractured formation skeleton by adding fractured pieces into the sample powder and then controlling the pressure, and a corresponding sample can be obtained by dissolving the obtained consolidated formation skeleton. A loose formation skeleton can be directly simulated with loose sand. Then, the consolidated sample is cut to ensure that it can be placed in the hydrate generator 10. In the case of a loose sample, the sample should be laid evenly in the hydrate generator 10, and a small amount of methane gas should be introduced into the hydrate generator 10 to verify the gas tightness of the apparatus. After the gas tightness is verified, a certain amount of water is added into the sample, in view that natural gas can generate hydrates only after it is dissolved in water.
- step S2: filling natural gas into the reactor 11 via the gas source device 30, so that the pressure of the reactor 11 is within a preset pressure range;
- step S3: adjusting the cryogenic cooler so that the temperature of the reactor 11 is within a preset temperature range; and
- step S4: observing the pressure change inside the reactor 11 during hydrate formation.

A loose formation can be directly simulated with loose sand, while a consolidated formation sample has to be obtained by controlling the pressure with a hydrate formation simulation apparatus for consolidated formation skeleton 50. A solidified formation skeleton 50 can be obtained from a fractured formation skeleton by adding fractured pieces into the sample powder, placing the sample powder into the hydrate formation simulation apparatus for solidified formation skeleton 50, and controlling the pressure; then a corresponding sample can be obtained by dissolving the obtained solidified formation skeleton 50. The gas pressurizing device, the cryogenic cooler, the hydrate generator 10 and reactor 11 are cleaned, the sample of simulated hydrate formation is placed in the reactor 11, a proper amount of methane gas is introduced into the reactor 11 to verify the gas tightness of the apparatus, and then the gas is exhausted after the gas tightness is verified. Gas is supplied from the gas source 31 through the gas cylinder 32; after the gas content reaches a specific value, the gas supply is stopped, and the gas source 31 is turned off. the volume of the pressurizing cylinder 33 is changed to adjust the pressure till the pressure meets the experimental requirements. Then the pressure can be switched off. After the temperature of the cryogenic cooler is adjusted to a required range, hydrates are gradually generated. The process of hydrate formation can be monitored by observing the pressure indication. Hydrates are formed slowly as the pressure drops.

The entire simulation process of hydrate generation in the first and second embodiments will be further explained in detail as follows:

When a consolidated hydrate formation is to be simulated, first, a consolidated rock core is prepared with the hydrate simulation apparatus for consolidated formation skeleton 50, the mineral composition in the hydrate formation area is selected for study, and the porosity is adjusted by controlling the pressure, to ensure that the rock core meets the experimental requirements. Then, the prepared rock core skeleton of simulated consolidated hydrate formation is placed into the formation simulation space 13 formed inside the pressure-resistant hose 12. The rock core skeleton is obtained with an artificial rock core technique in the laboratory, is consistent with the field formation in terms of the porosity and formation composition, etc., and can be used to simulate a real rock core skeleton of hydrate formation accurately. The gas outlet part 15 and the gas outlet form a sealing part, and the gas outlet part 15 has internal threads; the threads of the sealing column 16 on the top cover of the reactor 11 match the threads in the gas outlet part 15, and the gas outlet part 15 can be connected to the formation simulation part by rotation till the bottom of the gas outlet part 15 is in contact with the rock core. The connected part is connected to the main part of the reactor 11 filled with a certain amount of liquid to complete the connection of the hydrate generator 10. In order to simulate a consolidated hydrate formation better, it is necessary to apply certain confining pressure around the rock core to simulate the squeezing effect of the underground surrounding strata; specifically, liquid is injected into the apparatus through the connecting pipeline of the pressurizing pump 34, so as to increase the liquid content in the internal space of the reactor 11. Since the volume of the internal space of the reactor 11 is fixed, the pressure will gradually increase. Since the pressure-resistant hose 12 is pliable and tough, the pressure will be transferred into the sample successfully, thus certain confining pressure is applied to the sample, so that the formation space can be simulated better.

The gas source 31 is turned on to introduce a small amount of methane gas, so as to verify the gas tightness of the apparatus. It can be judged that there is no gas leakage and the apparatus has sound gas tightness if the observed indication on the pressure gauge 60 is stable. The gas source 31 is turned on, and the gas is introduced into the communication system composed of the gas cylinder 32 and the pressurizing cylinder 33. By adjusting the pressurizing pump 34, the volume of the pressurizing cylinder 33 is changed, and the pressure is adjusted to a required range. The gas is introduced into the formation simulation space 13 through the air inlet. In that way, both the gas source 31 and the pressure required by the experiment are provided, and the required pressure is usually 4-8 MPa. The temperature is adjusted by means of the cryogenic cooler, and is accurately controlled to a temperature required by the experiment, which is usually 2-5° C. Hydrates will be gradually formed under such conditions.

Embodiment 2

The main difference between loose hydrate formation simulation and consolidated hydrate formation simulation is that the pressure-resistant hose 12 is removed when a loose hydrate formation is to be simulated. Thus, the internal space of the reactor 11 becomes the formation simulation space 13. Here, no liquid is loaded in the central part of the internal space of the reactor 11, and it is unnecessary to use the pressurizing pump 34 to inject liquid into the internal space of the reactor 11. Instead, a loose sand sample with known porosity is evenly laid in layers in the internal space of the reactor 11, and an assembly consisting of the top cover of the reactor 11, the gas inlet part 14, and the support rods 17, etc. is placed into the loose formation by rotating the assembly slowly to avoid an uneven pore space of the loose formation in the reactor 11 caused by insertion at an excessive high speed. In view that water is required for hydrate formation, treated water without entrained air is poured into the loose formation evenly to avoid the influence of air on the experiment. Then, a sealing cover assembly consisting of the gas outlet part 15 and the gas outlet is connected to the reactor 11, and the hydrate generation state is observed by observing the change of the pressure curve.

In addition, ultrasonic transducers 70 are mounted inside the opposite end faces of the gas inlet part 14 and the gas outlet part 15 respectively to monitor the waveform changes during hydrate formation, and can be used with acoustic detection assemblies to observe the waveform after hydrate formation to study the properties of the hydrates.

In the description of the present disclosure, it should be understood that the terms "first" and "second" are used only for a description purpose, and should not be interpreted as indicating or implying relative importance or implicitly indicating the quantity of the indicated technical features. Hence, a feature confined by "first" or "second" may explicitly or implicitly comprise at least one such feature. In the description of the present disclosure, "a plurality of" or "multiple" means at least two, such as two or more, etc., unless otherwise specified explicitly.

In the present disclosure, unless otherwise specified and defined explicitly, the terms "install", "connect", "fix", etc. shall be interpreted in their general meaning. For example, the connection may be fixed connection, detachable connection, or integral connection; may be mechanical connection or electrical connection or in communication with each other; may be direct connection or indirect connection via an intermediate medium, or internal communication or interactive relation between two elements. Those having ordinary skills in the art may interpret the specific meanings of the terms in the present disclosure in their context.

In the description of the present disclosure, the expressions of reference terms "an embodiment", "some embodiments", "an example", "specific example", or "some examples" mean that the specific features, structures, materials or characteristics described in those embodiments or examples are included in at least one embodiment or example of the present disclosure. In this document, the exemplary expression of the above terms may not necessarily refer to the same embodiment or example. Moreover, the specific features, structures, materials, or characteristics described can be combined appropriately in any one or more embodiments or examples. Furthermore, those skilled in the art may combine or assemble different embodiments or examples and features in different embodiments or examples described herein, provided that there is no conflict among them.

While the present disclosure is illustrated and described above in embodiments, it should be understood that the embodiments are exemplary only and shall not be deemed as constituting any limitation to the present disclosure. Those skilled in the art can made variations, modifications, and replacements to the embodiments within the scope of the present disclosure.

We claim:

1. A multi-type hydrate formation simulation system, comprising:
    a hydrate generator, comprising a reactor, in which a formation simulation space is provided and is selectively filled with a loose formation skeleton or a consolidated formation skeleton, the reactor comprising a top, a bottom, and an entire internal space;
    a gas source device configured to introduce natural gas at a preset pressure into the formation simulation space, so that the loose formation skeleton or the consolidated formation skeleton can produce a simulated loose hydrate formation or a consolidated hydrate formation; and
    a cryogenic cooler, comprising a temperature-adjustable thermotank, wherein the hydrate generator is arranged in the thermotank, and a temperature adjustment range of the thermotank is −10~20° C.

2. The multi-type hydrate formation simulation system of claim 1, wherein the hydrate generator further comprises a gas inlet part and a gas outlet part, wherein the gas inlet part is arranged in a body of the reactor near the bottom of the reactor, and the gas outlet part is mounted on an upper end face of a top cover of the reactor; a gas outlet pipe connecting the formation simulation space to the external environment is provided in the gas outlet part in a manner that the gas outlet pipe penetrates through the gas outlet part vertically, the gas inlet part is in communication with the gas source device via a gas inlet pipe, and two radial side ends of the gas inlet part are connected to a lower end face of the top cover of the reactor via support rods.

3. The multi-type hydrate formation simulation system of claim 2, wherein the top of the reactor is provided with a sealing column, the gas outlet part penetrates through the sealing column and extends out of an upper end face of the sealing column, and the sealing column is rotatably connected to the top of the reactor through threads.

4. The multi-type hydrate formation simulation system of claim 2, wherein the formation simulation space is the entire internal space of the reactor, in which the loose formation skeleton is filled.

5. The multi-type hydrate formation simulation system of claim 2, wherein a hollow pressure-resistant hose is provided in the reactor, with a central axis of the hollow pressure-resistant hose coinciding with a central axis of the reactor, the pressure-resistant hose comprising a top and a bottom; the formation simulation space is a hollow cavity of the pressure-resistant hose, a solidified formation skeleton is filled in the hollow cavity of the pressure-resistant hose, the gas inlet part is inserted into the pressure-resistant hose from the bottom of the pressure-resistant hose, and the gas outlet part is inserted into the pressure-resistant hose from the top of the pressure-resistant hose.

6. The multi-type hydrate formation simulation system of claim 5, wherein the central axis of the pressure-resistant hose coincides with the central axis of the reactor, and pressure-resistant oil exerting confining pressure axially on the pressure-resistant hose is filled between an outer circumferential wall of the pressure-resistant hose and an inner circumferential wall of the reactor.

7. The multi-type hydrate formation simulation system of claim 2, wherein the gas source device comprises:
   a gas source assembly, comprising a gas source and a gas cylinder, wherein the gas cylinder is configured to store the natural gas from the gas source and output the natural gas through the gas inlet pipe; and
   a pressurizing assembly, comprising a pressurizing cylinder and a pressurizing pump, wherein the pressurizing pump is connected to the reactor and the pressurizing cylinder through a second pressurizing pipeline and a first pressurizing pipeline respectively.

8. The multi-type hydrate formation simulation system of claim 7, wherein the gas inlet pipe, the gas source and the gas cylinder are provided with a pressure gauge for monitoring the pressure respectively.

9. The multi-type hydrate formation simulation system of claim 7, wherein a first communication pipeline between the gas source and the gas cylinder, a second communication pipeline between the gas cylinder and the pressurizing cylinder, the second pressurizing pipeline, the first pressurizing pipeline, the gas inlet pipe and the gas outlet pipe are provided with a stop valve for controlling connection and disconnection of the respective pipeline respectively.

10. A multi-type hydrate formation simulation method using the multi-type hydrate formation simulation system of claim 1, comprising the following steps:
   step S1: preparing a formation core sample and placing the formation core sample in the formation simulation space in the reactor;
   step S2: filling natural gas into the reactor via the gas source device, so that the pressure of the reactor is within a preset pressure range;
   step S3: adjusting the cryogenic cooler so that the temperature of the reactor is within a preset temperature range; and
   step S4: observing the pressure change inside the reactor during hydrate formation.

\* \* \* \* \*